United States Patent [19]

Cerveira de Mello Ribeiro Pinto

[11] Patent Number: 4,702,423
[45] Date of Patent: Oct. 27, 1987

[54] CHOPPER HARVESTERS FOR SUGAR CANE AND SIMILAR PRODUCTS

[75] Inventor: Luiz A. Cerveira de Mello Ribeiro Pinto, Ribeirao Preto - SP, Brazil

[73] Assignee: Santal Equipmentos S.A., Brazil

[21] Appl. No.: 794,649

[22] Filed: Nov. 4, 1985

[51] Int. Cl.⁴ .............................................. B02C 18/22
[52] U.S. Cl. ....................... 241/60; 56/13.3; 241/101.7; 241/222
[58] Field of Search .................... 241/55, 56, 57, 58, 241/60, 222, 223, 224, 101.7, 277; 56/13.3, 13.4

[56] References Cited

U.S. PATENT DOCUMENTS 4,177,953 12/1979 Ribeiro Pinto ...................... 241/58

FOREIGN PATENT DOCUMENTS 204833 12/1983 Fed. Rep. of Germany ... 241/101.7

*Primary Examiner*—Mark Rosenbaum
*Attorney, Agent, or Firm*—Darby & Darby

[57] ABSTRACT

Improvements in chopper harvesters of the cut-throw type, characterized by the use of a cutting-throwing system consisting of two concentric revolving axles in the center of a static cylinder, the inner and faster axle driving the cutting knife and the external slower axle driving inclined and curved throwing vanes, with the cut billets of cane being thrown through a static inclined duct, fitted in it's upper part with blowers or extractors providing an horizontal air current blowing across said duct towards the rear of the harvester.

11 Claims, 6 Drawing Figures

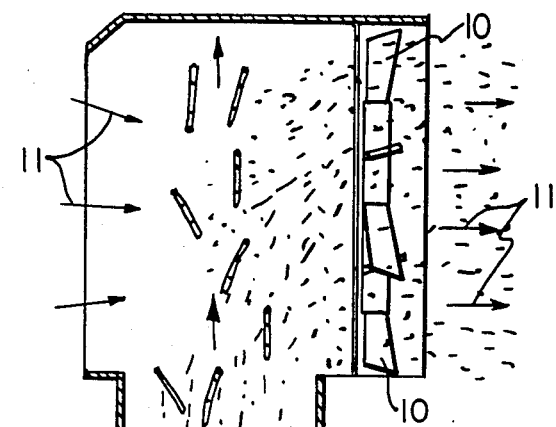
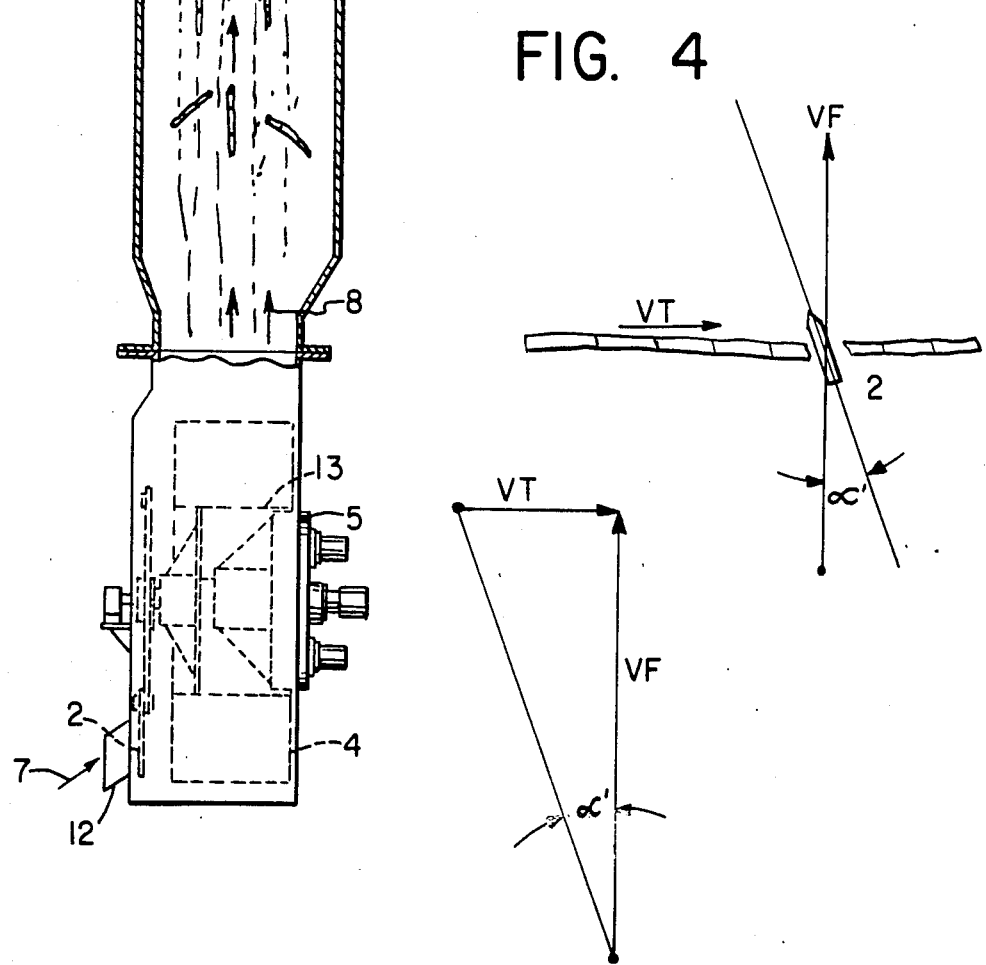

CHOPPER HARVESTERS FOR SUGAR CANE AND SIMILAR PRODUCTS

BACKGROUND OF THE INVENTION

The present patent application refers to improvements in chopping, throwing and cleaning systems for mechanical harvesters of sugar cane. The main problem area of present chopper harvesters is related to billet quality, in terms of properly cut edges and freedom of trash.

To minimize this problem, we developed the present improvements, which consist of a new chopping and throwing system free of chain drives, and a new horizontal cleaning design, providing much better performance than earlier known systems, such as the system shown in U.S. Pat. No. 4,177,953 developed by the present patentee. The new systems offer high reliability, ease of maintenance, better cutting and a remarkable trash extraction capability.

SUMMARY OF THE INVENTION

The new chopping and throwing system consist of two concentric and rotating axles placed along the longitudinal center of a static cylinder having an outlet cut out on it's uppermost surface, said outlet provided with an external directional duct inclined towards the discharge side of the harvester, through which are thrown the cane billets. The two concentric axles are mechanically coupled through a gear box having a 1:2 or preferable 1:3 gear ratio. The internal axle is the faster one, and supports a rotating knife, with it's cutting profile adjusted to the relative angle defined by the average cane longitudinal speed and the average knife peripheral speed.

The slower external axle two or preferably three, (according to the gear ratio) inclined radial vanes are equally spaced around said axle, said vanes being curved towards the rotating sense and placed behind (towards the rear of the harvester) the knife rotating plane. The cleaning system, placed on the upper part of the directional duct have at least one, preferably two, extracting fans or preferably blowers, providing an approximately horizontal air current blowing across the duct towards the rear of the harvester.

The chopper-throwing system is designed to give sufficient speed to the thrown billets and associated trash, so to make them go through the cleaning zone, where the aerodynamic separation of billets and trash takes place, with the clean billets going through said zone and falling into the transport vehicle, and the trash beeing blown to the rear of the harvester.

The syncronization of the knife throwing vanes, essential for the perfect timing of the cutting and subsequent throwing of the cane billets, is achieved by proper phasing of the mechanical gear box linking the two concentric axles.

The preferred 3:1 ratio of knife throwing vanes insure a better and more gentle billet throwing by the vanes.

DESCRIPTION OF THE DRAWINGS

The systems will now be described with reference to FIGS. 1 to 6.

FIG. 3 shows a lateral view of the same, with extractors fitted to the aerodynamic cleaning system;

FIG. 4 shows the knife angle ($\alpha$).

DETAILED DESCRIPTION OF THE PREFERRED EMBODIMENTS OF THE INVENTION

Figure 1:
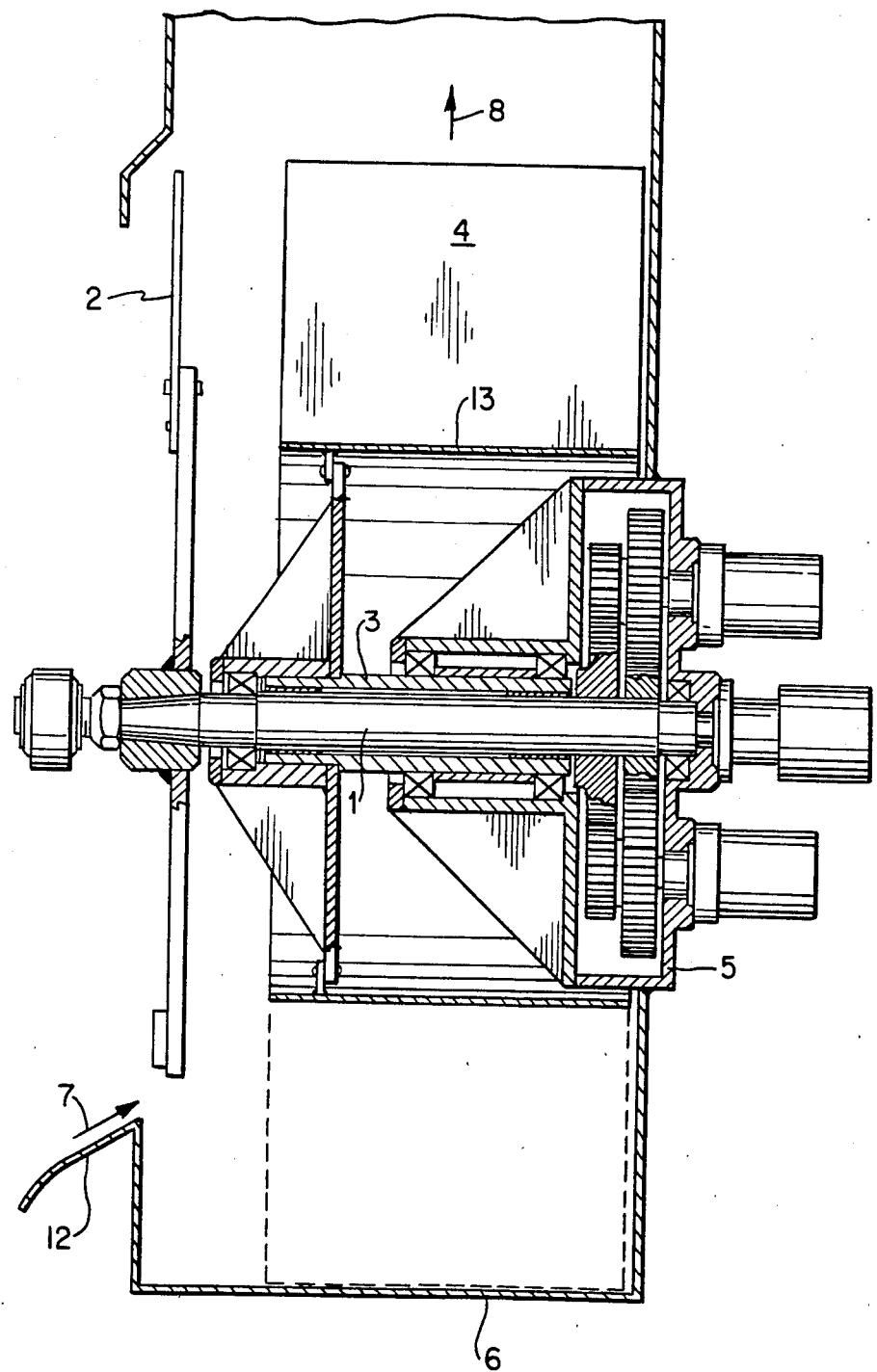
FIG. 1 shows a lateral view of the cutting and throwing system, and related gear box with optional hydraulic drives.
Figure 2:
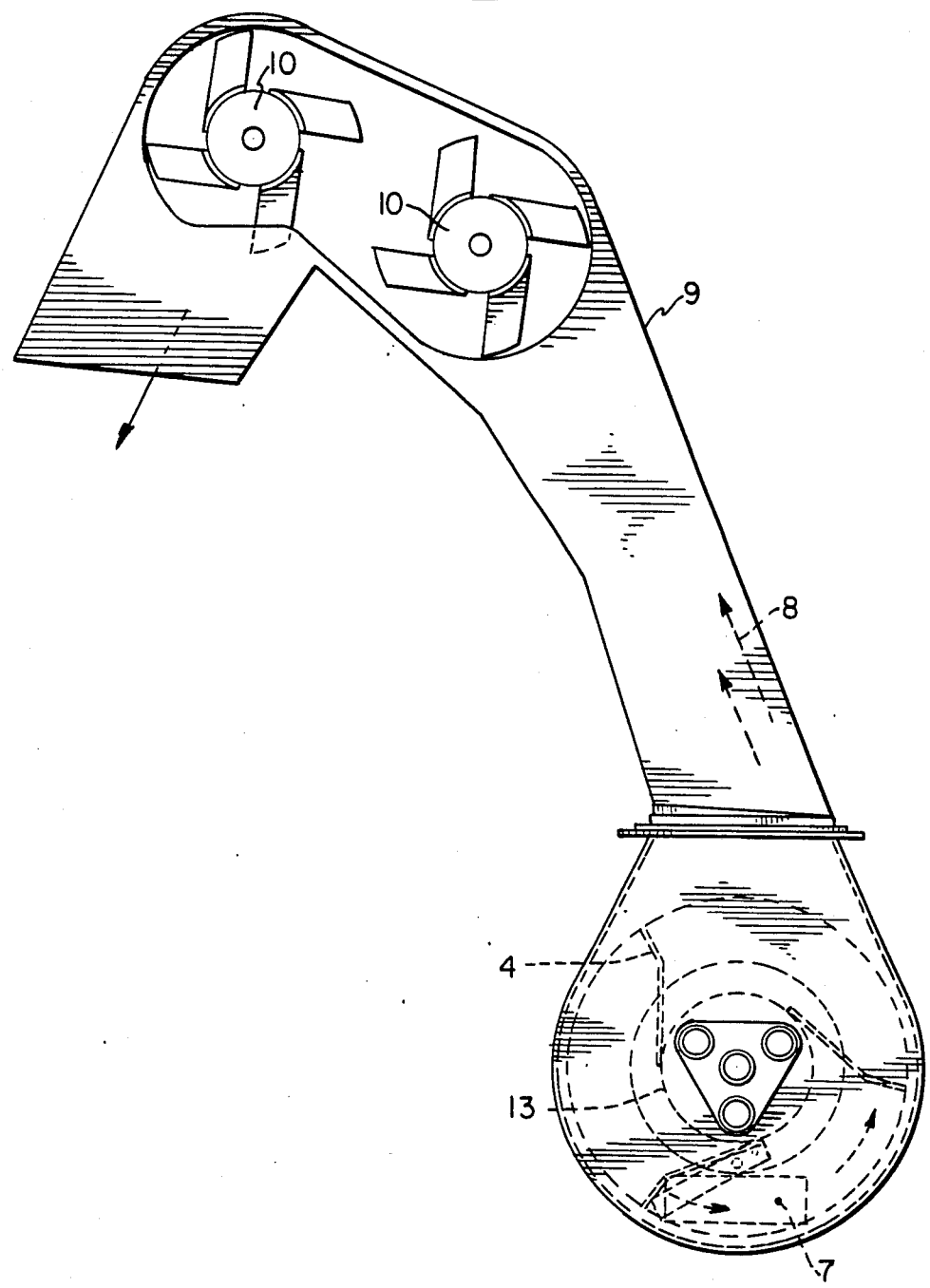
FIG. 2 shows a rear view of the chopper thrower, directional duct and cleaning system.
Figure 5:
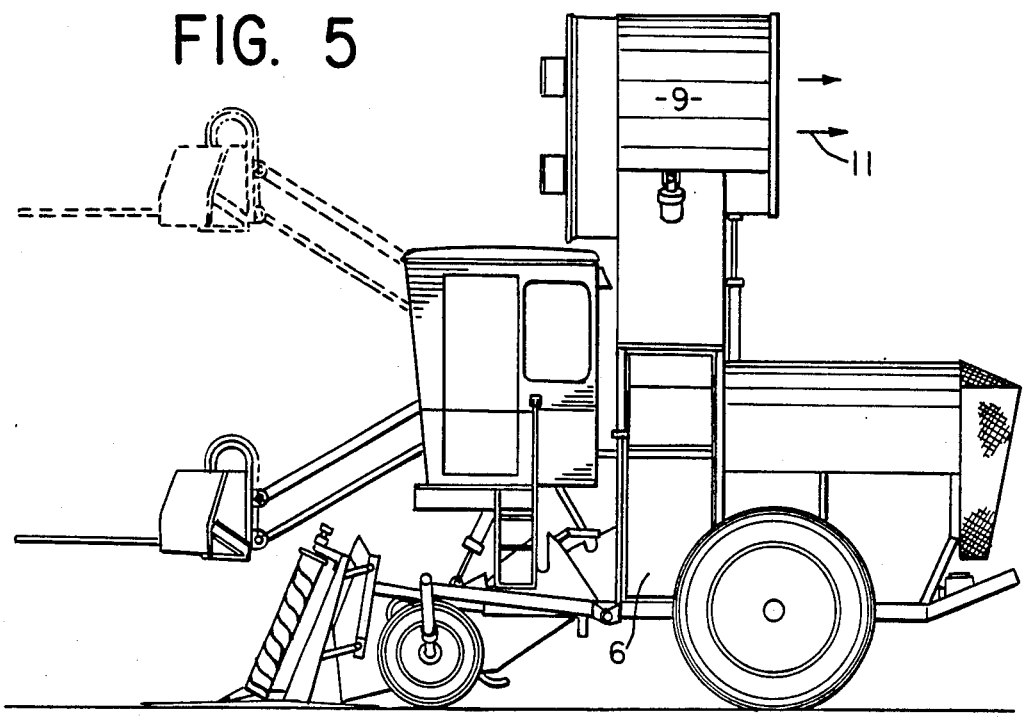
FIGS. 5 and 6 show a complete harvester incorporating the new systems.
Figure 6:
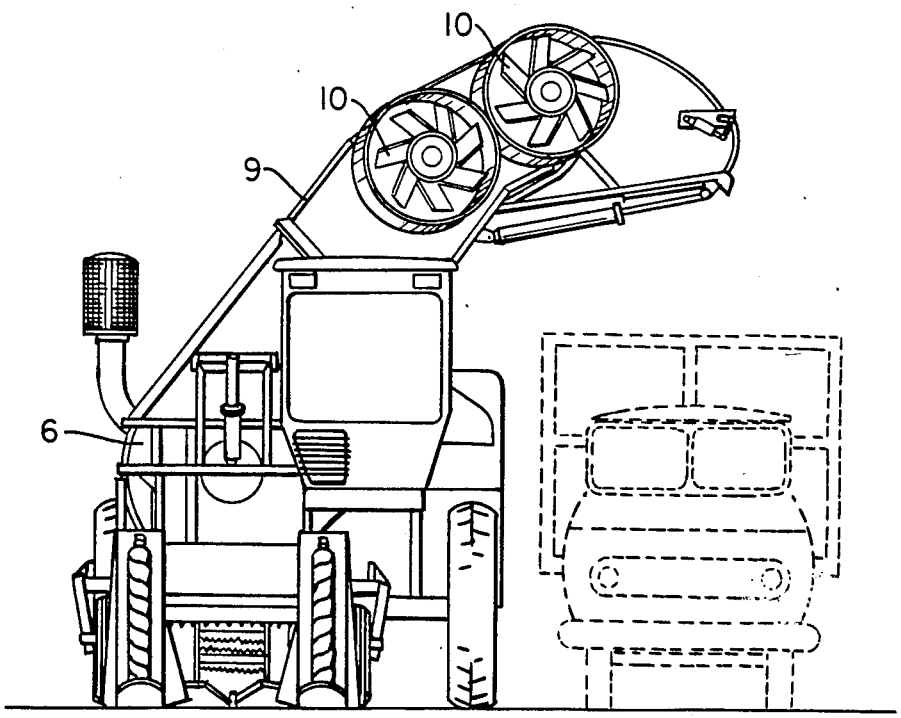

According to these illustrations, the cutter-throwing system consists of two concentric axles (1 and 3), approximately horizontal, linked and synchronized by the gear box (5), axle (1) being the faster and supporting the knife (2). The slower rotating axle (3) supports the throwing vanes (4), attached to internal concentric rotating cylinder (13). These two axles and associated knife (2), cylinder (13) and vanes (4) rotate on the interior of static and concentric cylinder (6), provided in it's front plane face with an opening (7) for the entering cane, a fixed cutting support plate (12), and an outlet (8) on it's upper cylinder surface. Over said outlet (8) a directional duct (9) is placed, inclined towards the discharge side the harvester, said duct being provided with at least one or preferably two extractor or blowers (10) forcing a powerfull air current approximately horizontal (11) across the said duct (9) directed towards the rear of the harvester.

To minimize knife and cane interference, cutting knife (2) is angled in relationship to the axle (1) perpendicular plane by an angle ($\alpha$) (see FIG. 4) determined by the relative speeds of the knife (VF) and the cane feeding speed (VT) on the average cutting zone.

The driving system for the cutter-thrower can be entirely mechanical, by suitable drives to the gearbox (5), or by hydraulic motors as shown in FIG. 1.

What is claimed is:

1. A sugar cane harvesting machine of the type for cutting sugar cane into billets, and throwing the billets from a cutting assembly through a static delivery duct having an outlet for ejecting the billets therefrom, wherein the improvement comprises:

a cylindrical housing including inlet means for receiving sugar cane to be cut into billets, and an outlet means for ejecting said billets therefrom;

chopper-thrower means including:

a first axle centrally mounted within said housing along the central axis thereof;

cutting blade means rigidly mounted at one end of said first axle, the latter being rotational for rotating said cutting blade means past said inlet means for cutting said sugar cane as it enters said housing through said inlet means;

a second axle mounted over and wholly concentric with said first axle, said first and second axles being independently rotatable;

vane means rigidly mounted upon said second axle for rotation therewith for throwing said billets through said outlet means.

2. The improvement of claim 1, further including drive means for rotating said first and second axles each at predetermined speeds, respectively.

3. The improvement of claim 2, wherein said drive means rotates said first axle at a faster speed than said second axle.

4. The improvement of claim 2, wherein said drive means drives said first axle at a faster speed than said second axle in a predetermined speed ratio therebetween.

5. The improvement of claim 4, wherein said drive means drives said first axle at a speed three times that of said second axle.

6. The improvement of claim 1, wherein said cutting blade means includes at least one radial cutting knife.

7. The improvement of claim 6, wherein said radical cutting knife is displaced at an angle relative to its rotational plane that is optimized in view of the feeding speed of sugar cane into the rotational path of said knife, and the average rotational speed of a cutting plane circumscribed by the rotating knife.

8. The improvement of claim 1, wherein said vane means is mounted upon said second axle behind said cutting blade means relative to said inlet means.

9. The improvement of claim 1, wherein said vane means includes at least two vanes for upon rotation throwing said billets through said outlet means.

10. The improvement of claim 9, wherein said vane means further includes internal cylindrical shroud means rigidly attached via an inside face to and concentric with said second axle, said vanes being equally spaced upon and rigidly tangentially mounted to the outside circumferential face of said shroud means, for rotating said vanes thereon.

11. The improvement of claim 1, further including:
a directional duct having an inlet attached to the outlet means of said cylindrical housing, and a discharge port for discharging said billets to a desired collection point; and
aerodynamic cleaning means mounted within the portion of said directional duct furthest from said cylindrical housing, for providing air current flow across the upper interior portion of said duct in a direction substantially ensuring the complete discharge of said billets from said duct, thereby maintaining a clean duct for the transport of said billets.

* * * * *